W. O. TALCOTT.
BELT FASTENER.
APPLICATION FILED JULY 27, 1916.
1,218,227.
Patented Mar. 6, 1917.
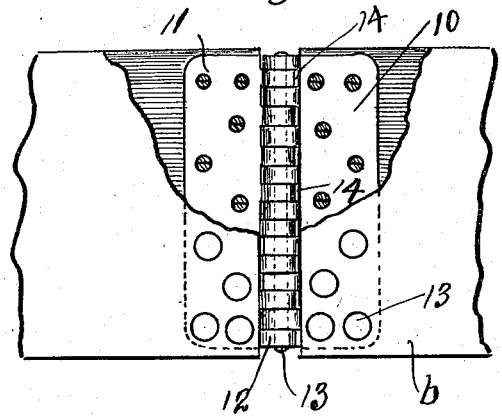
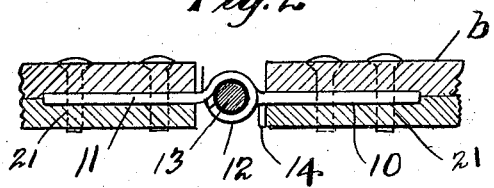
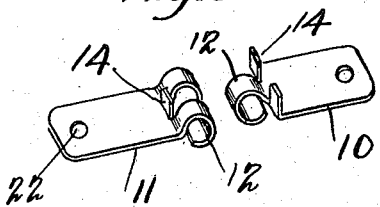
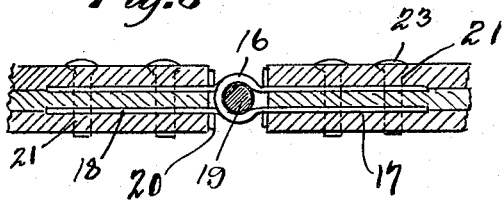
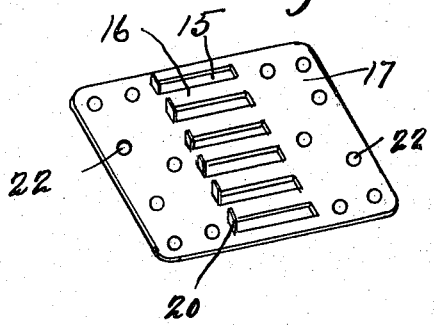
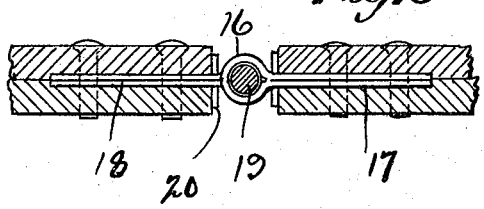
Witnesses
J. L. Macdermott
A. F. Macready.
Inventor
Walter O. Talcott.
By Howard E. Barlow
Attorney

UNITED STATES PATENT OFFICE.

WALTER O. TALCOTT, OF PROVIDENCE, RHODE ISLAND, ASSIGNOR OF ONE-HALF TO MANCEL W. TALCOTT, OF PROVIDENCE, RHODE ISLAND.

BELT-FASTENER.

1,218,227.      Specification of Letters Patent.      Patented Mar. 6, 1917.

Application filed July 27, 1916. Serial No. 111,549.

*To all whom it may concern:*

Be it known that I, WALTER O. TALCOTT, a citizen of the United States, and resident of the city of Providence, in the county of Providence and State of Rhode Island, have invented certain new and useful Improvements in Belt-Fasteners, of which the following is a specification.

This invention relates to improvements in belt fasteners of the class designed to connect together the ends of belts employed for driving machinery, and the object of this invention is to form such a fastener of a pair of plates hinged together each being adapted to be passed between the belt layers, said plates being provided with one or more rivet holes for receiving fastenings passed through each of the belt ends and a gage member raised above the plane of each of said plates whereby the plate is adapted to serve as a templet for first punching the rivet holes in the belt and then as a gage for positioning the plate between the layers, to cause its rivet holes to register with those in the belt.

By forming a gage-lip or member on the plates, and so adapting it to serve as a templet by which to punch the rivet holes through the belt, I obviate the necessity of carrying a special templet for each fastener, and by the use of a plate so constructed an unskilled mechanic may accurately punch the holes in the belt even when obliged to work in the most inconvenient places. After the belt has been punched the plate may be positioned between the layers to positively insure the fastening of the belt ends in perfect alinement one with the other, which is of utmost importance in the connecting of belt ends, to insure the true running of the belt.

With these and other objects in view, the invention consists of certain novel features of construction, as will be more fully described, and particularly pointed out in the appended claims:

In the accompanying drawings:

Figure 1— is a plan view showing my improved fastener as applied to and connecting together the adjacent ends of a belt, the plies of the belt ends being broken away to better show the plate inserted between them.

Fig. 2— is an enlarged edge view of the hinge fastener shown in Fig. 1.

Fig. 3— is a perspective view showing a pair of narrow plates each having one end bent into the form of an eye and to interlock one with the other through which a pin may be passed to form the joint of the hinge.

Fig. 4— is a perspective view showing a hinge plate formed of thin stock with cut out middle sections whereby this plate may be bent upon itself and this middle portion shaped to receive the hinge pintle, the complemental hinge member being arranged to interlock therewith to complete the pair of hinge plates.

Fig. 5— is an edge view showing a pair of these plates interlocking and when bent upon themselves being spaced to enter between the plies of a three ply belt.

Fig. 6— shows the same hinged with its plates lying side by side and inserted into a two ply belt.

Referring to the drawings, my improved fasteners are designed to be used between the layers or plies of rubber, canvas, leather or other belting *b* and consists of a pair of plates 10 and 11, each with one edge having a portion bent into the form of an eye as at 12, and these bent portions are cut so that they will interlock one with the other to be placed in alinement to receive the pivot pin 13.

The essential feature of my improved belt fastener is that each of these plates is provided with a gage-lip 14 formed by utilizing the stock cut from between the rivet eye portions. The length of each of these lips is substantially that of one-half the thickness of the belt or less and are turned at substantially a right angle to the plane of the plate.

These hinge plates may be formed broad with a plurality of interlocking eye shaped fingers in each as illustrated in Fig. 1 or they may be formed in narrow strips as best illustrated in Fig. 3.

In some cases where it is desired to use very thin stock in the belt, I form the hinge plates 17 and 18 of double width and of sheet stock having their middle portions slotted at intervals as at 15, after which this plate is folded upon itself with the fingers or slotted portions 16 bent into eye form, as illustrated in Figs. 5 and 6.

The complemental plate 18 is similarly formed with its fingers, slats or hinge portions fitting into the corresponding slots in the plate 17, and a pin 19 is passed through the holes in both to form a hinge between them. In some cases, in order to reduce the wear of this joint to the minimum, I preferably form the hinge pin of rawhide or other suitable material which will take the wear instead of the metal and prolong the life of the fastener.

In some cases where three ply belting is used I sometimes separate the folded parts and place the plates between the different layers as illustrated in Fig. 5 or when it is desired to insert this fastener into a two ply belt the plates may lie face to face upon each other as illustrated in Fig. 6.

The gage-lips or members 20 are formed from a portion of the stock removed between the slats or fingers 16 and are raised from the surface of the plate as illustrated in Fig. 4.

By forming these plates of sheet metal these lips may be cut from the stock and raised from the body of the plate as the same is formed and the rivet holes cut all in the same operation.

In applying my improved fasteners, the perforated plate is first placed upon the outside surface of the belt, with the projecting lips pressed close against the end of the belt, thus making a gage or templet of the fastener which enables the operator to punch or pierce the holes 21 in the belt, so they will exactly correspond in position with the holes 22 in the plate or fastener.

The middle plies of the belt are then separated and the perforated plate is inserted between the plies, and the projecting lips are pressed against the end of the belt as before. This brings the holes of the plate exactly in line with the holes in the belt ready to receive the fastenings which are then inserted through the plies of the belt and the intermediate plate and clenched or riveted on the opposite side.

If my perforated hinge plate was not provided with these projecting lips or guide members, it would be necessary to have a separate pattern or templet for each plate for punching or piercing the holes so they would match the plate, but with the addition of these projecting lips, my belt fastener also becomes a templet or pattern for punching or piercing the holes so that they will exactly coincide with the holes in the plate thus insuring perfect work even when performed by an inexperienced mechanic.

This feature is of utmost importance in the connecting together of belt ends as it is well known by those practised in the art that unless the ends are connected in perfect alinement one with the other that one side of the belt becomes tighter than the other causing the belt to constantly run off its pulleys.

I do not wish to limit myself to the use of my improved fastener plate exclusively on the inside or between the layers of the belt, as in some cases the plate may be applied to the outer surface of the belt if desired, the lips in both cases serving as a gage for accurately punching or forming the rivet holes through the belt.

I have described one illustrative embodiment of my invention but I desire it to be understood that although specific terms are employed they are used in a generic sense and not for the purpose of limitation, the scope of the invention being set forth in the following claims.

I claim:

1. A belt fastener comprising a pair of plates hinged together each being shaped to be passed between the belt layers, said plates being provided with one or more rivet holes for receiving fastenings passed through corresponding holes in the end of the belt, and a gage member raised above the plane of each of said plates adjacent the hinge and adapted to engage the belt ends and provide a positive stop whereby said gage member serves as a templet for first locating the points at which the rivet holes in the belt are to be punched, and then as a gage for positioning the plate between the layers to cause its rivet holes to register with those in the belt.

2. A belt fastener comprising a pair of thin plates each folded upon itself and provided with interlocking sections hinged together at the bend, each leaf of said double plates being shaped to be passed between the belt layers, said plates being provided with one or more rivet holes for receiving fastenings passed through corresponding holes in each end of the belt, and one or more gage members raised above the plane of each of said plates adjacent the hinge and adapted to engage the belt ends and provide a positive stop to serve as a templet for first locating the points at which the rivet holes in the belt are to be punched and then as a gage for positioning the plate between the layers, to cause its rivet holes to register with those in the belt.

In testimony whereof I affix my signature in presence of a witness.

WALTER O. TALCOTT.

Witness:
HOWARD E. BARLOW.